Aug. 25, 1964     K. J. FISCHER     3,146,296
REARVIEW MIRROR DEVICE

Filed Nov. 5, 1962     2 Sheets-Sheet 1

INVENTOR.
Kenneth J. Fischer

BY Green, McCallister & Miller

HIS ATTORNEYS

Aug. 25, 1964     K. J. FISCHER     3,146,296
REARVIEW MIRROR DEVICE
Filed Nov. 5, 1962     2 Sheets-Sheet 2

INVENTOR.
Kenneth J. Fischer
BY Green, McCallister & Miller
HIS ATTORNEYS

United States Patent Office

3,146,296
Patented Aug. 25, 1964

3,146,296
REARVIEW MIRROR DEVICE
Kenneth J. Fischer, 116 W. Francis Ave., P.O. Box 98065,
Pittsburgh 27, Pa.
Filed Nov. 5, 1962, Ser. No. 235,501
3 Claims. (Cl. 88—87)

This invention relates to an improved mirror construction, unit or device, particularly suitable for motor vehicles, such as trucks, tractor-trailers, etc.

An important phase of the invention relates to the concept or devising of a unitary viewing mirror device suittable for mounting in a projecting relation on a side and adjacent the cab or driver's seat of a motor vehicle, that will be capable of full and accurate focal adjustment as to its mirror parts to meet the requirements of each individual driver, that when once adjusted for a particular driver will meet his full side and rear viewing needs for all driving conditions, and without further adjustment and without requiring supplemental side or rear view mirrors.

Another phase of the invention relates to a unitary mirror device or attachment for mounting on a motor vehicle and particularly, on a vehicle, that is bulky or of somewhat lengthy extent, wherein the device or attachment eliminates difficulties heretofore encountered by the driver in obtaining a sufficient side and rear view, particularly as to a so-called blank or dead viewing area of the vehicle, in such a manner as to assure full safety of driving.

A further phase relates to a unitary vision-reflecting mirror device that has an improved construction, such that one part may be effectively employed for adjacent intermediate side to back side and rear vision and the other part may be cooperatively and effectively employed for adjacent front side to intermediate side vision.

A still further phase relates to a viewing concept in which a vertically-elongated planar mirror is employed for intermediate side and back side and rear viewing and an associated cooperating substantially vertically-aligned spherical mirror is employed for substantially immediate or front side and widened intermediate side viewing and in such a manner as to give the driver of the vehicle an accurate and substantially full field of vision, even when he is turning his vehicle, as to the movement of other vehicles into and along a side or a passing lane.

I have been particularly concerned with the difficulties that a driver of a relatively heavy or large motor vehicle, such as a truck, a tractor-trailer or an auto-pulled house trailer, encounters from the standpoint of complete and accurate side and rear vision. Particular difficulty has been encountered as to the lane of travel of the vehicle which is remote to the driver's side of the cab or front seat. Also, the positioning of the windows is such that it is difficult, if not impractical, for the driver to look out of the window on his side of the cab in order to provide a better field of vision.

Although there have been many attempts to provide dual mirror arrangements particularly suitable for the cab of a vehicle, truck or tractor, they have all been discarded in favor of the present-day usage of a relatively large, rectangular-shaped, flat mirror having a dimension of about 16 inches in length and 6 inches in width which is adjustable on a vertical axis. In an endeavor to cover so-called dead areas or spots, it has then been customary to add separate fender, hood, door or other small mirrors at the front end of the vehicle. This has not only resulted in considerable confusion from the standpoint of the driver, but has not fully solved the problem of providing the driver with a full vision as to so-called dead areas along the vehicle. In addition, such a conglomeration of mirrors is confusing to the driver during periods of driving stress, is hard on his eyes, and has a tendency to pick up sun and light rays, reflecting them into the eyes of the driver.

Having for years driven heavy trucks and tractor-trailers, myself, I have found that many accidents are due to the lack of a full, accurate, and clear vision on the part of the driver, both during straight-away travel, and when it becomes necessary to turn the vehicle to the right or left at a crossroad or side lane. I have also found that a profusion of additional mirrors does not alleviate such conditions and, for this reason, many drivers today only use a flat mirror on each side of the cab of the vehicle, and rely on instinct to avoid accidents from the standpoint of inherent blind spots as to sides of the vehicle.

In investigations made in endeavoring to find a solution to the problem, I have found that others have contemplated a dual mirror construction, but that such constructions did not take into proper consideration the conditions involved, did not provide an essential type of viewing cooperation, and were never adopted because the so-called rectangular flat mirror gives a more accurate and better view, although it does not meet the problem of dead viewing areas. In analyzing the problem, I determined that it is possible to provide a dual mirror construction which can be adjusted to properly, in a new viewing cooperative manner, cover all side and rear view areas and which, when properly focused or adjusted for the particular individual driver involved, need not thereafter be readjusted for different driving conditions. In this connection, I discovered that such a device should employ a relatively large planar mirror, of vertically-elongated or rectangular shape, in such a manner as to cover the majority of the side area as well as the rear viewing area, and that this mirror should be capable of substantially horizontal-pivotal adjustment, as on a vertical axis. I also determined that a relatively smaller, spherical or convex mirror should be used in combination with such a planar mirror in such a manner as to cover the side front dead area and to overlap and widen the side intermediate area covered by the flat mirror, so that both mirrors will, in combination, cover the entire viewing requirements with respect to the side of the vehicle on which the device is mounted.

However, to make the spherical mirror effective in this connection, I discovered that it must be not only capable of horizontal-pivotal or vertical-axial adjustment along with the planar mirror, but that it should thereafter also be capable of an independent, fully radially-pivotal adjustment with respect to the planar mirror. Contrary to previous investigations in this connection, I found that the spherical or convex mirror should not be employed as the rear mirror, but only as the frontal to intermediate side-viewing mirror.

In accordance with my invention, I determined that the planar mirror can be adjusted on a vertical axis to give an accurate indication of distance from the standpoint of another vehicle approaching from the back of the vehicle or along a side lane with respect thereto, without the reduction in image of a convex mirror, and that the spherical or convex mirror, can be adjusted on a radial axis for frontal side viewing to cover the full dead area left from the standpoint of the planar mirror and that by reason of the closeness of the area being viewed, the spherical mirror will be accurate from the standpoint of the driver's judgment of distance. However, for this use of a convex mirror, I found that it is essential to provide it with a ball or full radial-pivotal or turnable type of mounting, as distinguished from a pivotal-horizontal or pivotal-vertical type of mounting.

It is also important in carrying out my invention in meeting the problem to provide both the planar mirror and the spherical or convex mirror with a common mounting, such that the pivoting of the planar mirror to its proper viewing position will carry the spherical mirror along with it, and that the spherical mirror may then be thereafter radially-pivoted into its final, fully cooperative, proper viewing position. By mounting a device of my construction on each side of the cab or driver's seat of a vehicle to extend outwardly adjacent the driver's seat or cab portion thereof or slightly behind the windshield, the driver has a full composite view from the standpoint of each device for its side of the vehicle from his seat, without eye strain, any danger of confusion or any dead viewing areas. The driver is, at all times, provided with full knowledge of traffic conditions on both sides of the vehicle, when driving along a main road, when turning off such a road, and when turning the vehicle around. That is, by means of only one device mounted on a side of a vehicle, the driver has no need for any other viewing devices for obtaining a full, accurate, and complete view along such side and, under all conditions of operation of the vehicle.

In devising my construction, I found that it is important to provide a planar mirror of requisite vertical extent and, on the other hand, that the mirror assembly should not materially exceed the 16 inches in length of the conventional planar mirror construction. That is, I found that the 16 inches of vertical height is about the maximum that a driver can see from his seat, without stretching his neck, distorting his position, and for viewing comfort. However, this appears to present a problem from the standpoint of an additional mirror in combination with the flat mirror. However, I found, on full analysis and checking, that about approximately 6 inches of the vertical height or length of the flat mirror could be eliminated without, in any sense, restricting the normal vision requirements of such a mirror, and that a spherical or convex mirror of approximately this size would be satisfactory for the purposes of my invention.

In fact, I have found that such 6 inches of height or vertical length of the flat mirror only gives a view of the sky to the driver and, in accordance with my invention, I have made effective use of this approximately 6 inch dimension in mounting the spherical mirror. Further, in this connection, I found that about a 5 inch diameter spherical or convex mirror would meet all the requirements of my invention and thus, that I could effectively utilize a flat mirror of shorter length to accomplish a full and effective rear and major side area viewing and employ the spherical or convex mirror for immediate front side to overlapping side viewing, in combination with the flat mirror, in such a manner as to provide an overall construction of approximately the same overall dimensions of the present flat mirror and its mounting.

Under today's conditions of heavy traffic where multilane highways and parkways have come into vogue and where passing of one vehicle by another may be permitted on both sides or lanes and where, under such conditions, the vehicles travel at relatively high rates of speed, the utilization of a device of my invention on each side of the cab or driver's seat fulfills all needs of the driver, and makes it possible for him to not only see other large vehicles, passenger cars, etc., but to also detect pedestrians, miniature automobiles, bicycles, and motor skooters. A mirror that requires continued adjustment by the driver is not satisfactory, since he needs both hands for steering and changing gears, etc., and further since it is difficult for him to concentrate on his driving while making adjustments that in no sense can be accurate under such conditions.

It has thus been an object of my invention to provide a new and improved mirror construction, assembly or device which will meet the factors above-mentioned and in such a manner as to ease the driving strain on the operator of a vehicle and to assure full safety in its operation;

Another object of my invention has been to develop an entirely new concept in this particular art from the standpoint of a viewing mirror construction or device which will provide a full and complete solution to the problems heretofore encountered;

A further object of my invention has been to devise a mirror construction or device which can be adjusted by and for a particular driver and when once adjusted by him will provide him with a full and complete as well as accurate side lane vision and rear vision throughout his driving of the vehicle and without the necessity of continued adjustment of the mirror parts involved;

A still further object of my invention has been to develop a combination mirror device that will be relatively simple in its construction and mounting, that may utilize lightweight materials, that will eliminate viewing aberrations and distortions and that, at the same time, will provide a fully safe, rear side to intermediate side to front side scope of viewing coverage for the driver of the vehicle, such that he can at all times quickly and accurately note the conditions of traffic along a side lane;

These and other objects of the invention will appear to those skilled in the art from the accompanying drawings and the description of the illustrated embodiment thereof.

In the drawings,

FIGURE 1 is a top plan view of a device of my invention, showing it in a mounted relationship with respect to a side of the vehicle which will normally be a side of the driver's seat or cab, adjacent to but behind the windshield thereof;

FIGURE 2 is an enlarged front or outer side view in elevation of the mirror device illustrated in FIGURE 1;

FIGURE 3 is an end view in elevation on the scale of and of the device shown in FIGURE 2;

FIGURE 4 is an end sectional view in elevation on the scale of and taken along the line IV—IV of FIGURE 2;

FIGURES 5 and 6 are horizontal sections on the scale of and respectively taken along the lines V—V and VI—VI of FIGURE 2 of the drawings;

Figure 7:
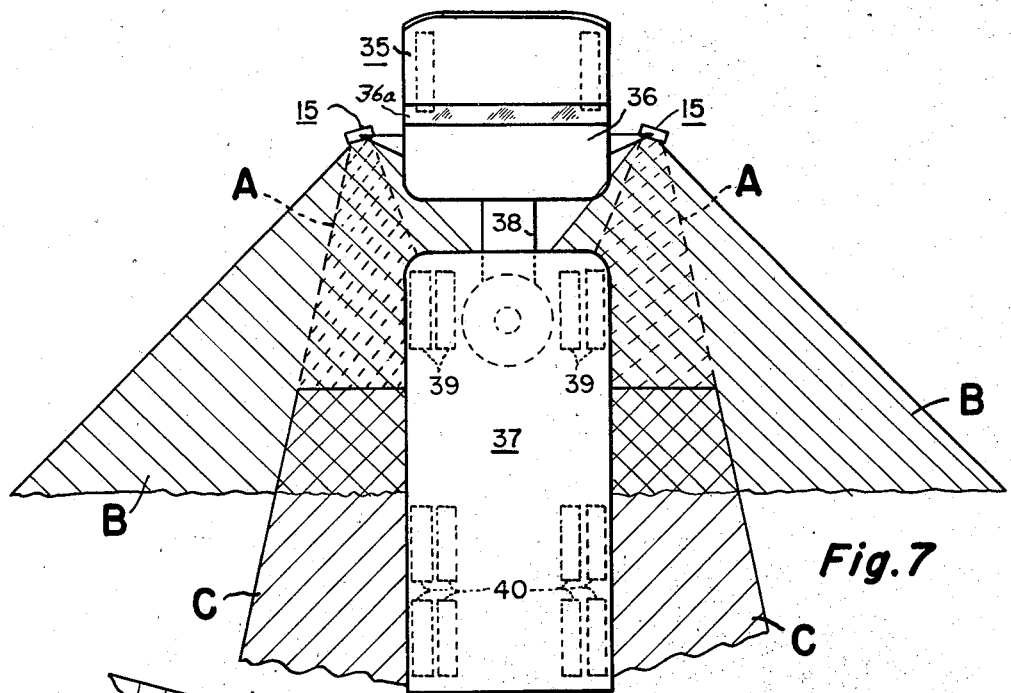
Figure 8:
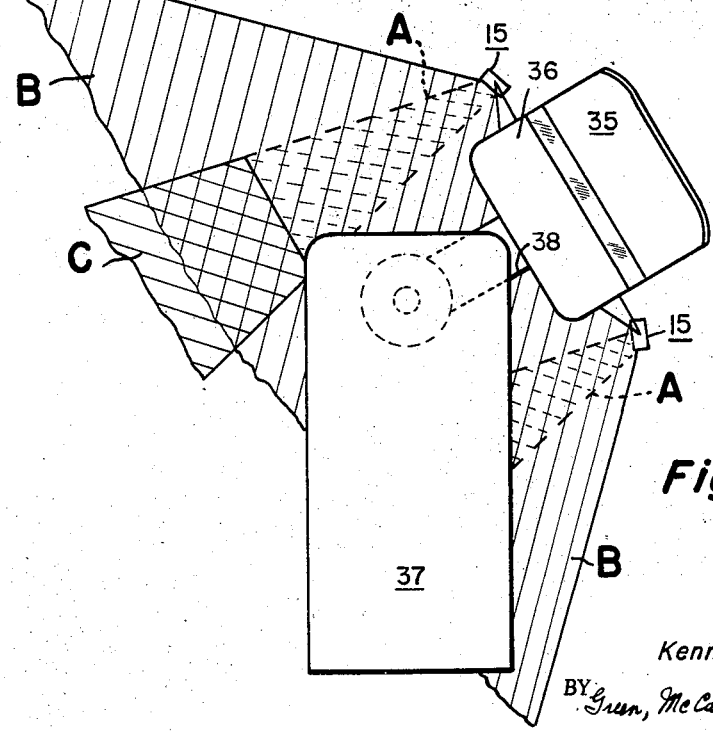

FIGURE 7 is a somewhat diagrammatic, greatly reduced, plan view illustrating the viewing concept of my invention as applied to a conventional tractor and trailer; this view shows the areas or fields of vision which are attained as to each side of the vehicle, where a device of my invention is mounted to extend therefrom; it also shows the normal critical or dead viewing areas which have heretofore presented so much trouble;

And, FIGURE 8 is a view similar to FIGURE 7, but illustrating the viewing areas attained when, for example the tractor-trailer is being turned rather than moving along a straight-away, as indicated in FIGURE 7.

Although there are those skilled in the art who believe that a sufficient rear vision cannot be obtained without the use of a reducing type of mirror and in spite of its lack of ability to give the driver an accurate determination of the distance at which another vehicle being viewed is from his particular vehicle, I have found that a planar or flat type of mirror of vertically-elongated or rectangular shape will give substantially the distance of rear viewing of a convex mirror and, at the same time, give an accurate indication of the location of the particular object or vehicle that is being viewed.

In my device, I employ a relatively elongated flat or planar type of mirror, primarily for rear to intermediate side viewing and use it in combination with a spherical mirror, which is so employed that it also assures an accurate object location indication, and which, with the first mirror, provides a full and accurate scope of vision from the rear to a side position slightly behind the windshield or ahead of the driver's position on his seat of the vehicle. Such a combination was only arrived at after many disappointments encountered in attempting various combinations and mountings of mirrors, including the use of convex and concave mirrors and planar mirrors, with and without lens, none of which, solved the problem. However, in experimenting with a spherical or convex mirror, I found that although its accurate distance range of vision was somewhat limited, that it was ideally suited for use in combination with a rear viewing planar mirror for frontal side viewing coverage, provided it has a proper form of cooperative mounting therewith. In employing a spherical mirror, I discovered that it had to be not only mounted for proper dependent adjustment with its associated planar mirror, but also for subsequent independent adjustment on a spherical or radial-pivotal axis of its own.

Referring particularly to FIGURES 1 to 6, inclusive, I have illustrated a viewing mirror device or unit 15 constructed in accordance with the principles of my invention. With particular reference to FIGURE 1, I have shown how the device 15 may be securely-mounted on the side 10 of a motor vehicle, such as a truck or tractor, adjacent the cab or the driver's seat. Top and bottom pairs of outwardly-projecting supporting or bracket arms 11 and 12 of rod or strap-like construction are rigidly secured at their inner, diverging ends to the side 10 of the vehicle by fixed mountings 11a and 12a. At their inner ends, the arms of each pair converge towards each other and define enlarged pivot eyelets 11b and 12b through which bolt, washer and nut assemblies 13 extend to mount opposite or top and bottom ends of an inner or back casing or housing part 16 on a vertical pivot axis. The back housing part cooperates with an outer or front part 17 to provide a vertically-elongated housing that, as shown in FIGURES 2 to 4, inclusive, is thus mounted for pivotal-horizontal adjustment with respect to the upper and lower bracket pairs of arms 11 and 12 and with respect to the side 10 of the vehicle. In this way, the entire unit 15, which carries a vertically-elongated or rectangular-shaped planar or flat face mirror 20 and a spherical mirror 27 on substantially the same vertical plane, may be adjusted to a particular driver's final viewing requirements as to the planar mirror 20.

The housing part 16, as shown in FIGURE 4, has a forwardly-projecting rim that telescopically-receives the front or outer housing part 17 thereover. Suitable screws, such as Phillips-head screws 18, may be employed to removably-secure the housing or casing parts 16 and 17 in a mounted relation with each other to define an inner compartment therealong. The planar or flat mirror 20 extends vertically along a major length portion of and is carried by the housing along its outer side from adjacent one vertical end thereof, shown as the supper or top end in the drawings, by means of a rim flange 17a. The rim flange 17a holds the mirror 20 in a securely-fixed position to define the front or outer vertical plane of the housing and to close-off its inner compartment.

A partition 19 is rigidly secured to extend between the back wall of the housing part 16 and the front wall of the housing part 17 to close-off the inner compartment, back of the planar mirror 20. A groove or offset portion 19a in the partition 19 is provided to receive the bottom edge of the planar mirror 20. A suitable resin or fabric lining may be provided about the circumferential edge of the mirror 20 in a sealing and insulating relationship with respect to the rim 17a and the offset portion 19a.

The partition 19 divides the main compartment into a closed-off compartment extending from one end of the housing and into a forwardly-open compartment extending from the opposite end of the housing. As shown in FIGURE 4, the housing part 16 may be provided with one or more drain open portions 16a for draining-off any moisture that may enter the open compartment. The lower or opposed end compartment of the housing is, as shown particularly in FIGURES 4 and 5, open to the front face of the housing and has a circular rim portion 17a that defines a circular open portion for receiving the spherical or convex mirror 27 and its immediate support housing or frame 26. The support frame 26 is shown of forwardly-concave shape and as having a circular rim flange portion 26a to securely-position the spherical mirror 27 with respect thereto in a vertical plane that is substantially parallel to the vertical outer plane of the planar mirror 20, but forwardly or outwardly with respect thereto. Relatively thin resin or fabric gaskets 29 may be positioned along the circumferential edge of the spherical mirror member 27 to seal and insulate it in its mounting within the supporting rim flange portion 26a.

The frame 26, at its back central portion, has a reinforcing socket portion 26b rigidly secured thereto, as by rivets or set screws 28, to radially-pivotally or turnably receive a spherical or ball end 25 of a mounting 22. The mounting 22 is of stem-like construction and its back end portion 23 is reduced and threaded to receive a nut and washer assembly 24 for securely mounting it on the wall of the housing part 16 to extend forwardly within the open compartment and support the mirror frame 26 in a spaced relation within the open area defined by the rim portion 17b. As shown particularly in FIGURES 2, 4 and 5, a clearance spacing is provided between the rim portion 17b of the housing and the rim portion 26a of the mirror frame 26 to permit full radial-pivot adjustment of the mirror frame 26 and its associated spherical mirror 27 with respect to the housing.

Employing a device of my invention, the relative positioning of the planar mirror 20 and the spherical mirror 27 with respect to each other and the housing assures a composite viewing relationship, when adjustments have been once effected for a particular driver, such that a convex or reducing type of mirror may be used for the frontal viewing to provide a full overall and backwardly-widened type of viewing area, as represented by B of FIGURES 7 and 8. The use of a convex mirror for relatively close viewing has been found to obviate difficulties heretofore encountered from the standpoint of the use of such a mirror for long distance back viewing. A lower positioning of the spherical or convex mirror 27 has also been found to be advantageous in carrying out the concept of my invention. By positioning the spherical mirror 27 in an outwardly-advanced relationship with respect to the planar mirror 20, I also assure full viewing without dead areas which is important in providing a composite viewing unit for the driver that can be used without eye strain and confusion by him in quickly and accurately obtaining a full area of view from the standpoint of each side of the vehicle. It will be noted that the mirror 27 is constructed to provide a virtual image. The housing parts 16 and 17, as well as the frame 26 of the spherical mirror 27, may be of light-weight metal or of resin material and, preferably of a fabric or fiber material impregnated with resin for an overall light-weight construction.

It will be apparent from the above described illustrated construction of a device of my invention that the driver of a motor vehicle may first horizontally-adjust the positioning of the housing 16, 17 to properly align the planar mirror 20 for viewing, in the manner previously described, and then radially-pivotally adjust the spherical mirror 27 on its mounting 22 and with respect to the planar mirror 20. The nature of the coordinated mounting construction, positioning and adjustment of the two mirrors provides viewing patterns or areas; such as illustrated in FIGURES 7 and 8. In these figures, I have shown a unit 15 of my construction mounted to project outwardly from opposite sides of a tractor 35, ahead of the driver's seat 36, and adjacent the windshield 36a. FIGURES 7 and 8 show the viewing areas provided by devices 15 of my invention after the driver has adjusted both of them to his particular requirements. In these figures, A indicates the normal dead area or space which extends from the cab or driver's seat of the vehicle or tractor 35, or in other words, from a front side portion of the vehicle backwardly to an intermediate portion thereof (which is represented by the back wheels 39 of the tractor and by the front portion of the trailer 37). It will be noted that the trailer 37 is connected to a coupling portion 38 of the tractor.

In accordance with my invention, the spherical mirror 27 provides a viewing area B which not only covers or overlaps the dead area A, but provides a widened intermediate side viewing area with respect to the normal starting portion of the viewing area C that is covered by the planar or flat mirror 20, and overlaps the area C at the intermediate side of the vehicle. The widening of the viewing area B is important from the standpoint of providing a full and complete side frontal to intermediate side coverage which is the area that heretofore has caused so many accidents; it also provides an accurate and good viewing area when, as shown in FIGURE 8, the vehicle is being turned in either direction. The viewing area C of one side unit 15 which is provided by the planar mirror 20 extends backwardly along the side of the trailer 37 and widens inwardly in back of the trailer to intersect the viewing area C of the other side unit 15, so that the area directly back of and beyond the trailer 37 to the rear thereof in the same lane of travel is also covered.

It is thus apparent that, employing a device or unit of my invention, the driver, once he has set the device, has an accurate and full composite vision from front to back along the side on which it is mounted on to the rear of the vehicle. In other words, by looking at one unit on each side of the vehicle, without strain on his eyes, he can obtain a full and composite view as to whether or not he is in the "clear" when making a turn. Once the mirrors of each device 15 are "set" for a particular driver, no further adjustment is necessary for different driving or road conditions.

What I claim is:

1. An improved combination mirror device of the character shown and described employing a pair of mirrors in a cooperating viewing relation with each other, which device is suitable for mounting adjacent the seat or cab of a motor vehicle in a side-projecting relation with respect thereto, wherein both mirrors are adjustable to provide each driver of the vehicle with an accurate and full composite vision from front to back along such side and to the rear of the vehicle which comprises, a rectangular vertically-elongated planar mirror of major dimension and a round spherical mirror of minor dimension from the standpoint of said planar mirror, a rectangular vertically-elongated housing having a vertical length greater than the combined vertical dimensions of said planar and spherical mirrors; said housing having side, top and bottom and back walls defining a vertically-elongated compartment therein and having a partition wall between said top and bottom walls dividing said compartment into an upper compartment for said planar mirror and a lower compartment for said spherical mirror; said housing having a unitary substantially vertically-planar front rim wall defining a vertically-elongated opening in the front of said housing for receiving said planar mirror, said rim wall having an annular portion defining a lower vertically-adjacent opening for said spherical mirror, means associated with said front rim wall for securing said planar mirror against an inner side thereof in a vertically-planar forwardly-facing position within said upper compartment to close-off the vertically-elongated opening, a mounting stem secured to a back wall of said housing substantially centrally of said lower compartment and projecting forwardly therefrom within said lower compartment, a support frame having an annular rim portion extending peripherally about said spherical mirror and mounting it in a forwardly-facing relation thereon, a radial-pivotal means adjustably-securing a back central portion of said support frame on a forward end portion of said mounting stem in such a manner that said annular rim portion and said spherical mirror project forwardly of the vertical plane of said vertically-planar front rim wall, the opening for said spherical mirror as defined by the annular portion of said front rim wall being in horizontal alignment with said lower compartment and of an enlarged diameter with respect to the diameter of said support frame and its said annular rim portion to provide spacing for free radial-pivotal movement of said support frame and said spherical mirror about said mounting stem, a pair of upper and lower brackets for secure mounting on the side of the vehicle, horizontally-pivotal means mounting said housing on said brackets in a side-projecting relation with respect thereto, whereby said housing may be pivotally turned with respect to said brackets for adjustably-positioning said planar mirror to intermediate side and back side and rear viewing requirements of each driver of the vehicle and for simultaneously adjusting said spherical member therewith; said spherical mirror, after the adjustable-positioning of said housing for the defined viewing of said planar mirror, being radially-pivotally adjustable with respect to said housing for front side and widened intermediate and overlapping intermediate side viewing requirements of each driver in combination with said planar mirror in its previously adjusted position; and said spherical mirror in its mounted position on said stem being in close vertical adjacency with and beneath said planar mirror, so that each driver may see both of said mirrors for simultaneous viewing.

2. An improved combination mirror device as defined in claim 1 wherein, the annular portion of said front rim wall has a flange that projects inwardly of said lower compartment and encircles said support frame and its annular rim portion, and said bottom wall of said housing has a drain portion therein open to said lower compartment for draining-off moisture introduced therein by reason of the spacing between said annular rim portion and the annular opening of said front rim wall.

3. An improved combination mirror device as defined in claim 1 wherein, said housing has a flanged back part and a flanged front framing part removably-positioned in a telescopic relation with respect to each other to define the vertically-elongated compartment therein, said front framing part carries said unitary front rim wall, and screw means is adapted to cooperatively-engage said front and back parts to secure them in their telescopic relation with respect to each other.

References Cited in the file of this patent

UNITED STATES PATENTS

| | | |
|---|---|---|
| 1,114,559 | Weed | Oct. 20, 1914 |
| 2,413,894 | Sorensen | Jan. 7, 1947 |
| 2,442,504 | Miller | June 1, 1948 |
| 2,493,546 | Orser | Jan. 3, 1950 |
| 2,796,506 | Lumbert | June 18, 1957 |
| 2,851,926 | Beach | Sept. 16, 1958 |
| 2,890,539 | Holt | June 16, 1959 |
| 3,104,274 | King | Sept. 17, 1963 |

FOREIGN PATENTS

| | | |
|---|---|---|
| 768,637 | Great Britain | Feb. 20, 1957 |